US012100939B2

(12) United States Patent
Fischer-Carne

(10) Patent No.: US 12,100,939 B2
(45) Date of Patent: Sep. 24, 2024

(54) CIRCUIT BREAKER WITH TERMINAL BUSHINGS HAVING DYNAMIC SEAL

(71) Applicant: JST POWER EQUIPMENT, INC., Lake Mary, FL (US)

(72) Inventor: Patrick R. Fischer-Carne, New Smyrna Beach, FL (US)

(73) Assignee: JST POWER EQUIPMENT, INC., Lake Mary, FL (US)

( * ) Notice: Subject to any disclaimer, the term of this patent is extended or adjusted under 35 U.S.C. 154(b) by 156 days.

(21) Appl. No.: 17/821,507

(22) Filed: Aug. 23, 2022

(65) Prior Publication Data

US 2023/0343528 A1    Oct. 26, 2023

Related U.S. Application Data

(60) Provisional application No. 63/363,318, filed on Apr. 21, 2022.

(51) Int. Cl.
*H01H 33/66* (2006.01)
*H01H 33/662* (2006.01)
(Continued)

(52) U.S. Cl.
CPC ......... *H02B 13/00* (2013.01); *H01H 33/6606* (2013.01); *H01H 33/662* (2013.01);
(Continued)

(58) Field of Classification Search
CPC ............. H01H 33/025; H01H 33/6606; H01H 33/662; H01H 33/66207; H01H 33/6662;
(Continued)

(56) References Cited

U.S. PATENT DOCUMENTS 3,055,968 A * 9/1962 Spiece .................. H01B 17/28
174/31 R
3,594,524 A * 7/1971 Heintz ................. H01H 33/666
218/119
(Continued)

FOREIGN PATENT DOCUMENTS

DE     102020212385 A1    3/2022
EP         3229323 A1    10/2017
(Continued)

OTHER PUBLICATIONS

Translation of JP2012151201 (Original document published Aug. 9, 2012) (Year: 2012).*

(Continued)

*Primary Examiner* — William A Bolton
(74) *Attorney, Agent, or Firm* — ALLEN, DYER, DOPPELT + GILCHRIST, P.A.

(57) ABSTRACT

A circuit breaker includes a frame having an interior compartment and an outer surface and a bushing opening. A circuit interrupter is mounted within the interior compartment. A terminal bushing is received within the bushing opening and has a lower terminal end extending into the housing and electrically connected to the circuit interrupter. An outer flange forms a bushing seat positioned adjacent the outer surface. An upper gasket is received against the outer flange. A seal pocket is formed by a bushing opening, upper gasket and outer surface of the terminal bushing. A dynamic seal is contained within the seal pocket and compressed an amount sufficient to provide elasticity and a compression height for dynamic loading of the upper gasket.

25 Claims, 16 Drawing Sheets

(51) Int. Cl.
  *H01H 33/666* (2006.01)
  *H02B 1/32* (2006.01)
  *H02B 13/00* (2006.01)

(52) U.S. Cl.
  CPC .. *H01H 33/66207* (2013.01); *H01H 33/6662* (2013.01); *H02B 1/32* (2013.01); *H01H 2033/66223* (2013.01)

(58) Field of Classification Search
  CPC . H01H 2033/66223; H01H 2009/0292; H01H 71/04; H02B 13/00; H02B 1/32; H02B 1/26; H02B 1/30
  USPC .................. 218/43, 12, 42, 79, 80, 97, 100
  See application file for complete search history.

(56) References Cited

U.S. PATENT DOCUMENTS

| | | | | |
|---|---|---|---|---|
| 4,965,407 A * | 10/1990 | Hamm | ............. | H01B 17/26 174/31 R |
| 5,019,937 A | 5/1991 | Beard | | |
| 6,074,229 A * | 6/2000 | Johansson | ............. | H02G 15/06 439/886 |
| 7,724,489 B2 * | 5/2010 | Montich | ............. | H01H 31/003 361/115 |
| 8,319,101 B2 * | 11/2012 | Adachi | ............. | H02G 15/064 174/152 R |
| 8,692,636 B2 | 4/2014 | Reuber | | |
| 8,764,467 B2 * | 7/2014 | Lee | ............. | H01R 13/53 439/181 |
| 9,355,792 B2 * | 5/2016 | Yoshida | ............. | H02B 13/0354 |
| 9,552,947 B2 * | 1/2017 | Heller | ............. | H01H 33/66261 |
| 10,543,511 B2 * | 1/2020 | Frimpong | ............. | G01S 11/14 |
| 10,643,814 B2 * | 5/2020 | Futane | ............. | H01H 71/025 |
| 2012/0071014 A1 * | 3/2012 | Dais | ............. | H01B 17/28 439/181 |
| 2016/0148727 A1 * | 5/2016 | Weatherbee | ............. | H01B 17/301 174/152 G |

FOREIGN PATENT DOCUMENTS

| | | | | |
|---|---|---|---|---|
| GB | 2191259 A | | 12/1987 | |
| JP | 2012151201 | * | 8/2012 | ............. H01H 33/33 |

OTHER PUBLICATIONS

U.S. Appl. No. 17/652,112, filed Feb. 23, 2022 Inventors: Patrick R. Fischer-Carne et al.
U.S. Appl. No. 17/821,496, filed Aug. 23, 2022 Inventors: Patrick R. Fischer-Carne.
U.S. Appl. No. 17/821,501, filed Aug. 23, 2022 Inventors: Patrick R. Fischer-Carne.

* cited by examiner

CIRCUIT BREAKER WITH TERMINAL BUSHINGS HAVING DYNAMIC SEAL

PRIORITY APPLICATION (S)

This utility application is based upon U.S. provisional application Ser. No. 63/363,318 filed Apr. 21, 2022, the disclosure which is hereby incorporated by reference in its entirety.

FIELD OF THE INVENTION

The present invention relates to the field of electrical systems, and more particularly, this invention relates to circuit breakers.

BACKGROUND OF THE INVENTION

Medium voltage indoor and outdoor circuit breakers and associated switchgear systems typically operate as three-phase systems that connect to the three-phase power distribution grid and provide protection against an undesirable circuit condition, such as short circuit events and similar overcurrent or other fault conditions. They often include circuit interrupters, such as vacuum interrupters, that open and close individual circuits. In many circuit breakers, the vacuum interrupters are normally fixed within the housing. A magnetic actuator may be carried by the vacuum interrupter and has the biasing force to operate the vacuum interrupters. A permanent magnetic actuator may have one or more permanent magnets and electric energy is applied to a coil to move a core or other mechanism into a stroke position which may open or close the contacts in a vacuum interrupter.

Permanent magnetic actuators can be formed as a bistable or mono-stable magnetic actuator depending on how their operating mechanism works and how any core or other mechanism is held at a preset position. A bistable type permanent magnetic actuator permits the core to be held at each of both ends of a stroke of the core due to the permanent magnets. A mono-stable type permanent magnetic actuator, on the other hand, is configured such that the core is held at only one of both ends of a stroke. Because a bistable type permanent magnetic actuator holds any core in a preset position by the magnetic energy imparted from the permanent magnets upon opening or closing the vacuum interrupter, the bistable actuator is considered by some skilled in the art to be better adapted for use with some circuit breakers. However, these magnetic actuators usually operate one latch connector or other common jack shaft that interconnect and switch open and closed three vacuum interrupters used in a three-phase electrical system. Single-phase operation is unworkable.

There are circumstances, especially with both indoor and outdoor circuit breakers and some switchgear systems, in which a quick visual determination is advantageous to determine whether the circuit interrupter is in a closed or open breaker position. Workers and maintenance personnel are often in a hurry to operate or maintain circuit breakers. Having the ability to discern quickly whether the circuit interrupter is in the closed or open breaker position could be lifesaving in some circumstances to prevent inadvertent mistakes when the circuit breaker is in the closed breaker position and "hot."

Additionally, with outdoor circuit breakers, terminal bushings are received within bushing openings located on the outer surface, such as at the top of the housing roof. These terminal bushings are formed of a ceramic material while the clamps, bolts and the outer surface, such as the outer surface or roof through which the terminal bushings are received, are formed of a metallic material such as aluminum having a much different coefficient of thermal expansion (CTE) than the ceramic material. The ceramic terminal bushings do not change dimension throughout the extreme temperature variations, ranging from −40° to 140° Fahrenheit. However, the clamps, roof and bolts change dimensions in extreme temperature variations and cause leaks around the terminal bushings, which can create dangerous short circuits or damage internal components contained within the outdoor circuit breaker.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

In general, a circuit breaker may comprise a frame defining a housing having an interior compartment and an outer surface and a bushing opening. A circuit interrupter may be mounted within the interior compartment. A terminal bushing may be received within the bushing opening, and has a terminal end extending into the housing and electrically connected to the circuit interrupter. An outer flange may form a bushing seat positioned adjacent the outer surface of the housing. An upper gasket may be received against the outer flange. A seal pocket may be formed by the bushing opening, the upper gasket, and an outer surface of the terminal bushing. A dynamic seal may be contained within the seal pocket and may be compressed an amount sufficient to provide elasticity and a compression height for dynamic loading of the upper gasket.

The dynamic seal may comprise an O-ring formed of an elastomeric material. The O-ring may be compressed about 20 to 40 percent when received within the seal pocket. The dynamic seal may comprise a C-shaped seal having a spring therein. At least one clamp may engage an upper surface of the outer flange, and a fastener may secure the at least one clamp. The at least one clamp, fastener, and outer surface may be formed of a first material having a first coefficient of thermal expansion, and the terminal bushing may be formed of a second material having a second coefficient of thermal expansion.

The circuit interrupter may include closed and open breaker positions and an actuator may be mounted within the interior compartment and connected to the circuit interrupter and configured to actuate the circuit interrupter into the closed and open positions. The actuator may comprise a magnetic actuator configured to receive an open or closed signal, and in response, actuate the circuit interrupter connected thereto into an open or closed circuit condition. The frame may be configured as an outdoor circuit breaker or an indoor circuit breaker. First, second and third single-phase circuit interrupters may be mounted within the interior compartment, and each may have closed and open breaker positions. A respective first, second and third actuator may be connected to respective first, second and third single-phase circuit interrupters. The first, second and third single-phase circuit interrupters may each comprise a single-phase vacuum interrupter.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Figure 1:
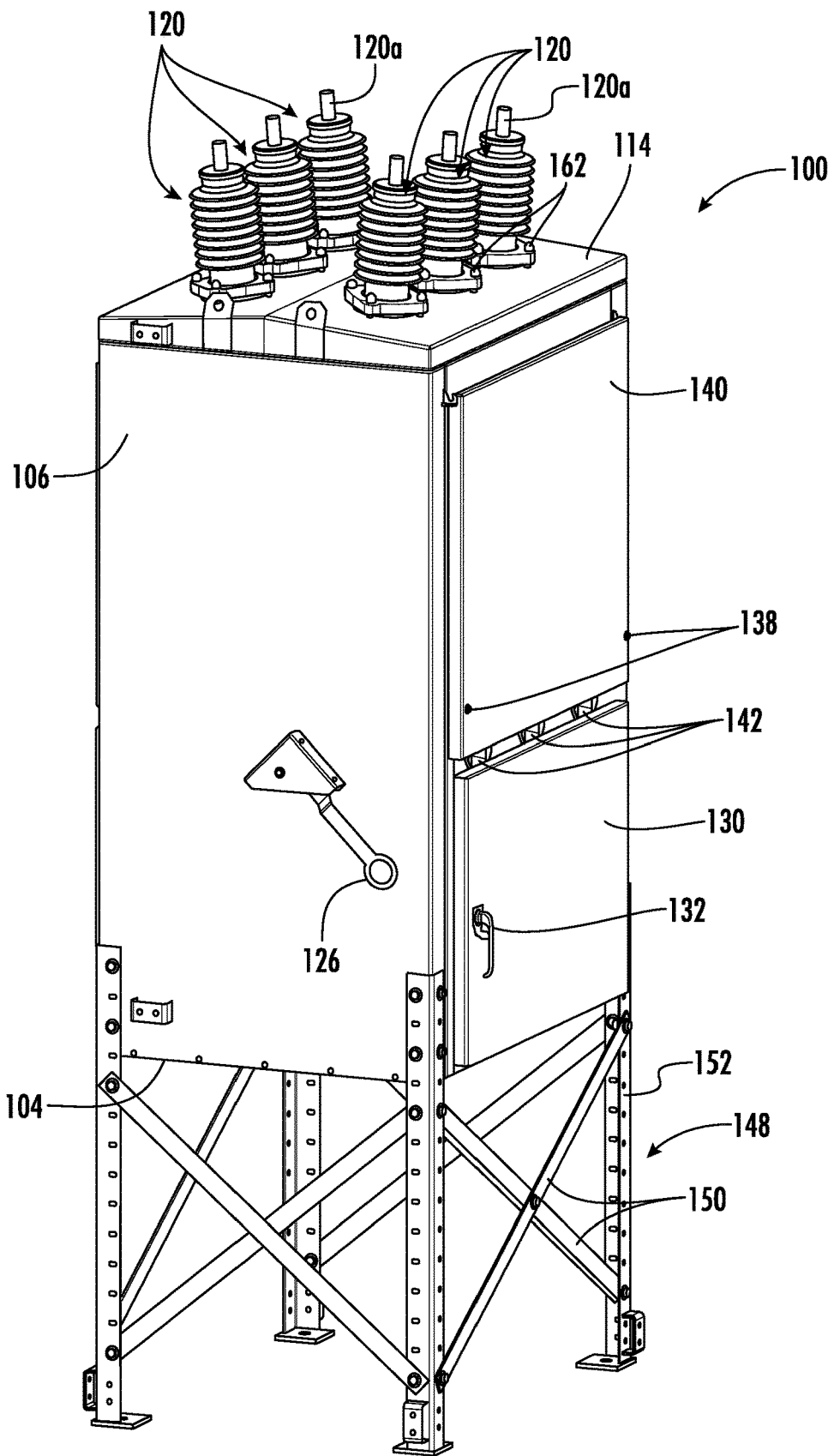
FIG. 1 is an isometric view of a circuit breaker, and in this example, an outdoor circuit breaker according to the invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Referring now to FIGS. 1-4, there are illustrated different views of a medium-voltage circuit breaker, formed in this example as an outdoor circuit breaker with single phase control and indicated generally at 100, which includes a frame 104 defining a switchgear housing 106 having an interior compartment 110 (FIGS. 3 and 4) and an outer surface 114, which includes a roof having a top surface. Bushing openings 118 are formed on the outer surface and receive a plurality of terminal bushings 120 within the bushing openings as illustrated by the first, second and third sets, each with two for a total of six terminal bushings shown in FIG. 1. The terminal bushings 120 may be received on any outer surface 114 of the switchgear housing, such as the side surface or top surface as a roof.

As will be explained in detail below, selected terminal bushings 120 electrically connect to the three-phase power grid 224 (FIG. 13) and to the loads, such as different street zones 220, and connect to circuit interrupters 124 operable as circuit breakers that are mounted and usually fixed within the interior compartment 110. Each circuit interrupter 124 includes a first upper and a second lower terminal 124a, 124b (FIGS. 3 and 4) and each in an example may be formed as vacuum interrupters. First, second and third vacuum interrupters 124 correspond to first, second and third sets of terminal bushings 120. In this example, the outer surface 114 may be made from aluminum and other portions of the outdoor housing 106 may be formed of aluminum or other metallic material as non-limiting examples. A lever 126 is positioned on the side of the outdoor housing 106 for actuation of components and may even be configured for emergency circuit breaking.

Figure 2:
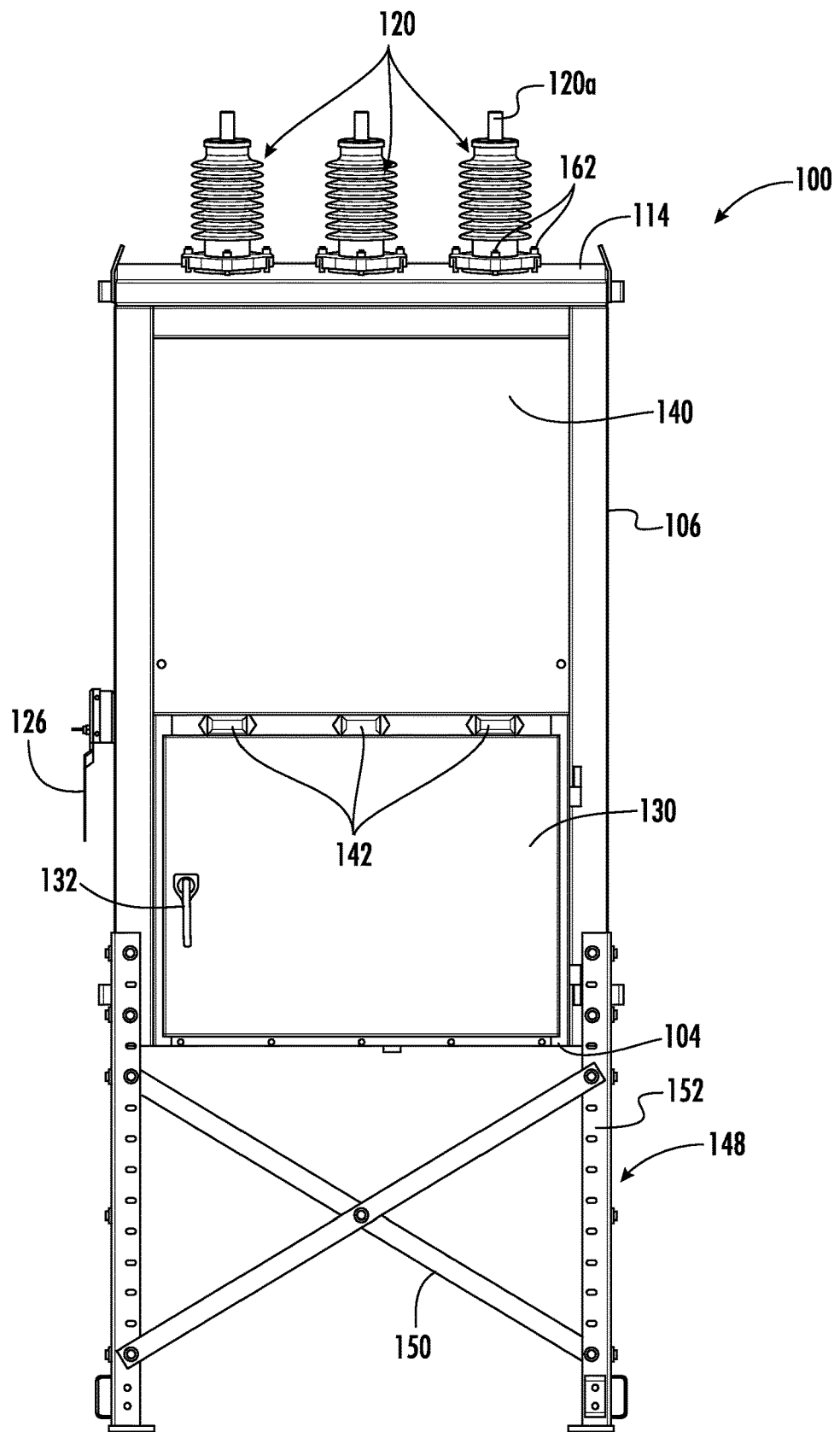
FIG. 2 is a front elevation view of the circuit breaker of FIG. 1.
Figure 3:
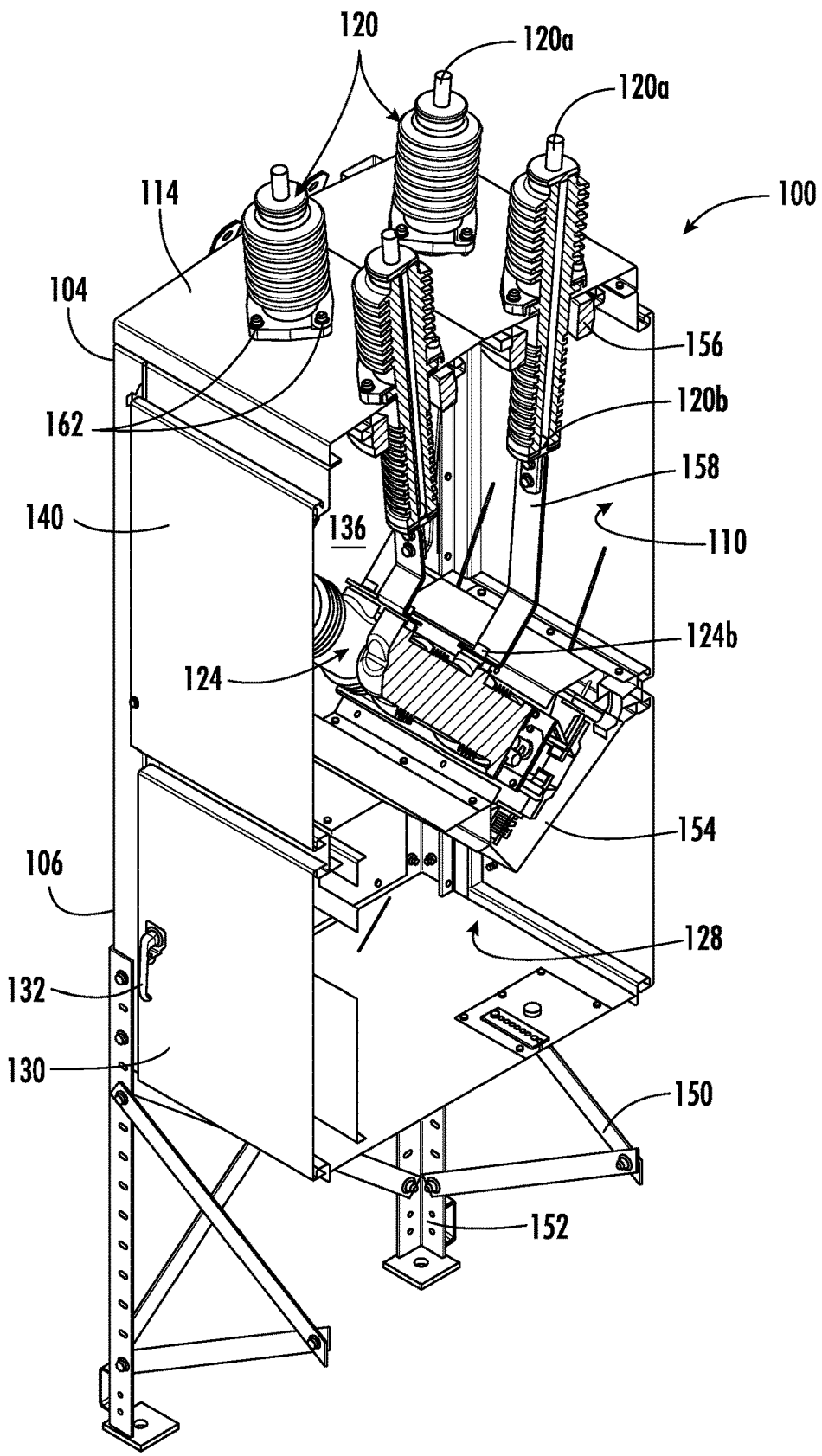
FIG. 3 is an isometric view of the circuit breaker of FIG. 1 cut along a vertical side sectional elevation.

As shown in the front elevation views of the circuit breaker 100 in FIGS. 2 and 3, the lower section of the housing corresponds to a low voltage compartment 128 and includes an access door 130 to that low voltage compartment that may be locked, but easily accessed via a door handle 132. The upper high-voltage compartment 136 is more secure, but may be accessed by removing bolts or other fasteners 138 on the upper front panel 140.

As will be explained in greater detail below, openings forming three view windows 142 are aligned horizontally above the access door 130 and aligned with three respective indicators 176 (two shown in FIG. 9) to expose for view respective first or second indicator surfaces 176a, 176b (FIG. 12) positioned on each respective indicator to indicate when one or more of the circuit interrupters 124 in this example are in respective closed or open breaker positions. In this example, the frame 104 that defines the outdoor housing 106 is supported on a stand 148 that includes adjustable cross-members 150 and legs 152 that may be adjusted to vary the height of the outdoor housing 106. The upper portion of the housing corresponding to the upper high-voltage compartment 136 includes the three different vacuum interrupters 124 that each have closed and open breaker positions to form the three-phase circuit breaker 100 having single phase control, which in this example is an outdoor circuit breaker.

In this example, each circuit interrupter 124 is mounted in a fixed arrangement within the interior compartment 110 at an angle (FIGS. 4 and 5) and each includes its respective first and second terminals 124a, 124b. In this three-phase circuit breaker 100, the three different circuit interrupters 124 are formed as vacuum interrupters. Each respective circuit interrupter 124 provides operation as a circuit breaker for one of the phases in the three phases. Each circuit interrupter 124 is mounted within the interior compartment 110 at an angled position relative to the vertical height of the outdoor housing 106 as best shown in FIGS. 3 and 4 to reduce the overall vertical height of the circuit breaker 100 and permit better connection of each vacuum interrupter to one of its sets of terminal bushings 120.

For each respective vacuum interrupter 124, first and second terminal bushings 120 are received within first and second bushing openings 118 and form one of the three sets. Each terminal bushing 120 has an upper terminal end 120a extending upward from the outer surface 114 as the roof in this example (but could be a side wall) and a lower terminal end 120b extending into the housing 106. The lower terminal end 120b is electrically connected to one of first or second terminals 124a, 124b on each of the circuit interrupters 124 as illustrated in FIGS. 3 and 4, depending on what the upper terminal end 120a for a respective terminal bushing connects, such as the power grid 224 or the load 220 as street zones, for example (FIG. 13). Each vacuum interrupter 124 has connected thereto an actuator 234, formed as a magnetic actuator in this example (FIGS. 9-12 and 14-16) and mounted within the interior compartment 110 and connected to its respective vacuum interrupter and configured to actuate the vacuum interrupter into closed and open breaker positions.

An internal divider 154 (FIGS. 3-5) separates the upper, high-voltage compartment 136 from the lower, low-voltage compartment 128. As illustrated, each terminal bushing 120 in this non-limiting example includes a slip-over current transformer 156 (FIGS. 3-8) positioned just below the roof 114 inside the outdoor housing 106. These current transformers 156 slip around the respective terminal bushing 120 to center the conductor of the current transformer 156 inside the "window" of the current transformer formed as a circular central opening and are configured to measure voltage and/or current. The current transformer 156 may operate as a sensing circuit 260 (FIG. 13) to aid in detecting an undesirable circuit condition, but other sensing circuits may be used, including resistive or capacitive voltage sensors, different types of transformers, Rogowski coils and other types of sensors. The first terminal 124a of the vacuum interrupter 124 may connect to a terminal bushing 120 that connects to incoming power.

Figure 4:
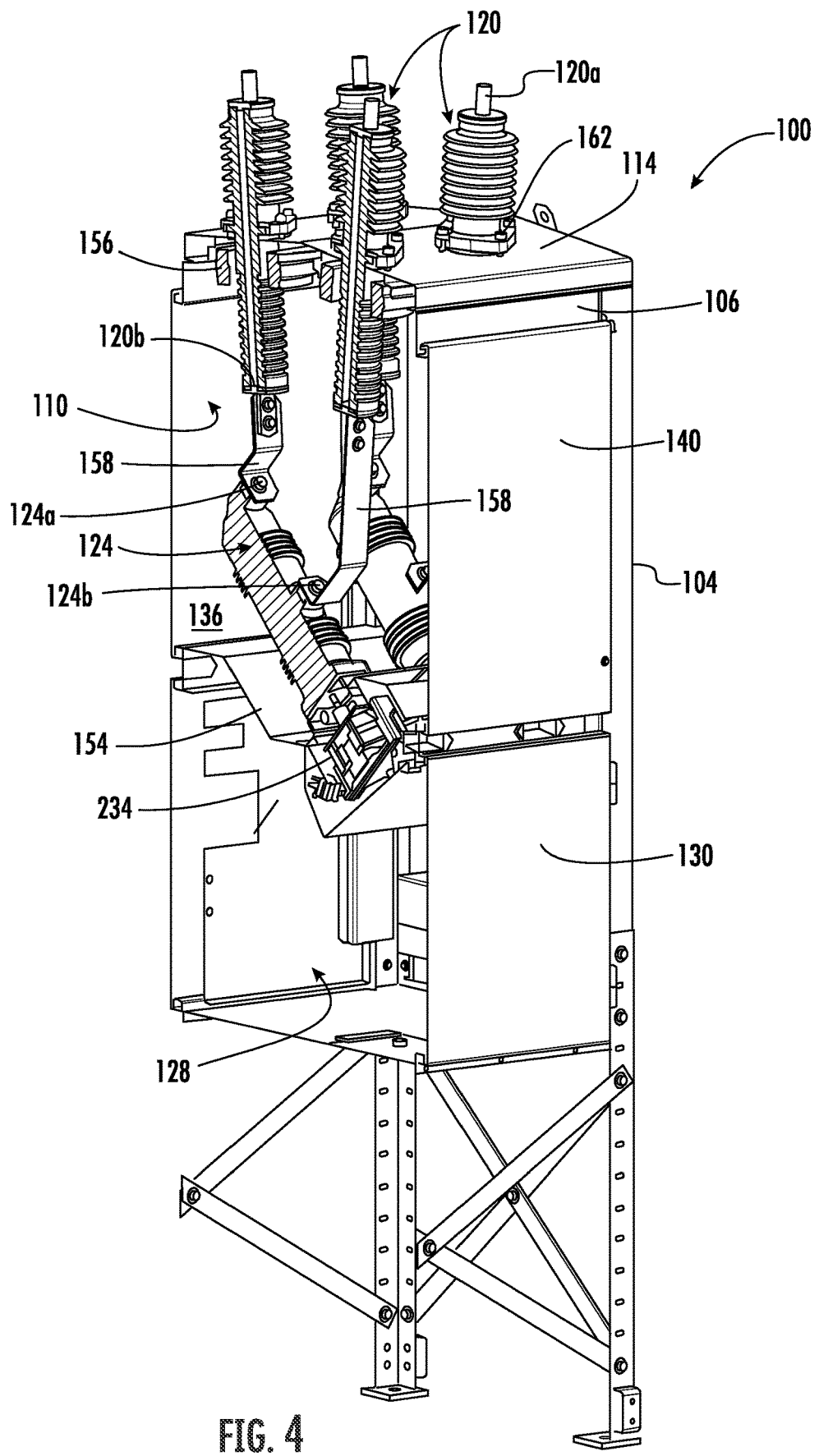
FIG. 4 is another isometric view of the circuit breaker of FIG. 1 cut along another vertical side sectional elevation different from that of FIG. 3.

Each terminal bushing 120 has its lower terminal end 120b extending into the outer housing 106 and electrically connected to one of the first or second terminals 124a, 124b of the respective vacuum interrupter 124 to which it is grouped as best shown in FIG. 4, where a terminal connector 158 similar to a bus bar connects the lower end 120b of a terminal bushing 120 with a terminal on the vacuum interrupter 124. The low-voltage compartment 128 may include auxiliary switches and other mechanical mechanisms (not shown) for operational adjustment, and include different mounting panels and control equipment, which are usually all accessible via the access door 130.

As illustrated in greater detail FIGS. 5-8, the terminal bushings 120 are received within the bushing openings 118, and in accordance with a non-limiting example, each terminal bushing 120 may include an outer flange 160 that forms a bushing seat that positions the respective terminal bushing 120 against and adjacent the outer surface 114, and in this example as illustrated, the top surface of the roof at the bushing opening. Mounting bolts 162 in this example are secured from the underside of the top surface of the roof 114, such as by welding, and extend upward adjacent the outer flange 160. In the example as best shown in FIG. 1, four mounting bolts 162 are positioned at 90° around the outer flange 160 that forms the bushing seat. The mounting bolts receive a mounting clamp 164 that engages the top surface of the outer flange 160. A nut is secured on each mounting bolt 162 to secure the terminal bushing 120 onto the outer surface 114, and in this example, the roof.

Figure 7:
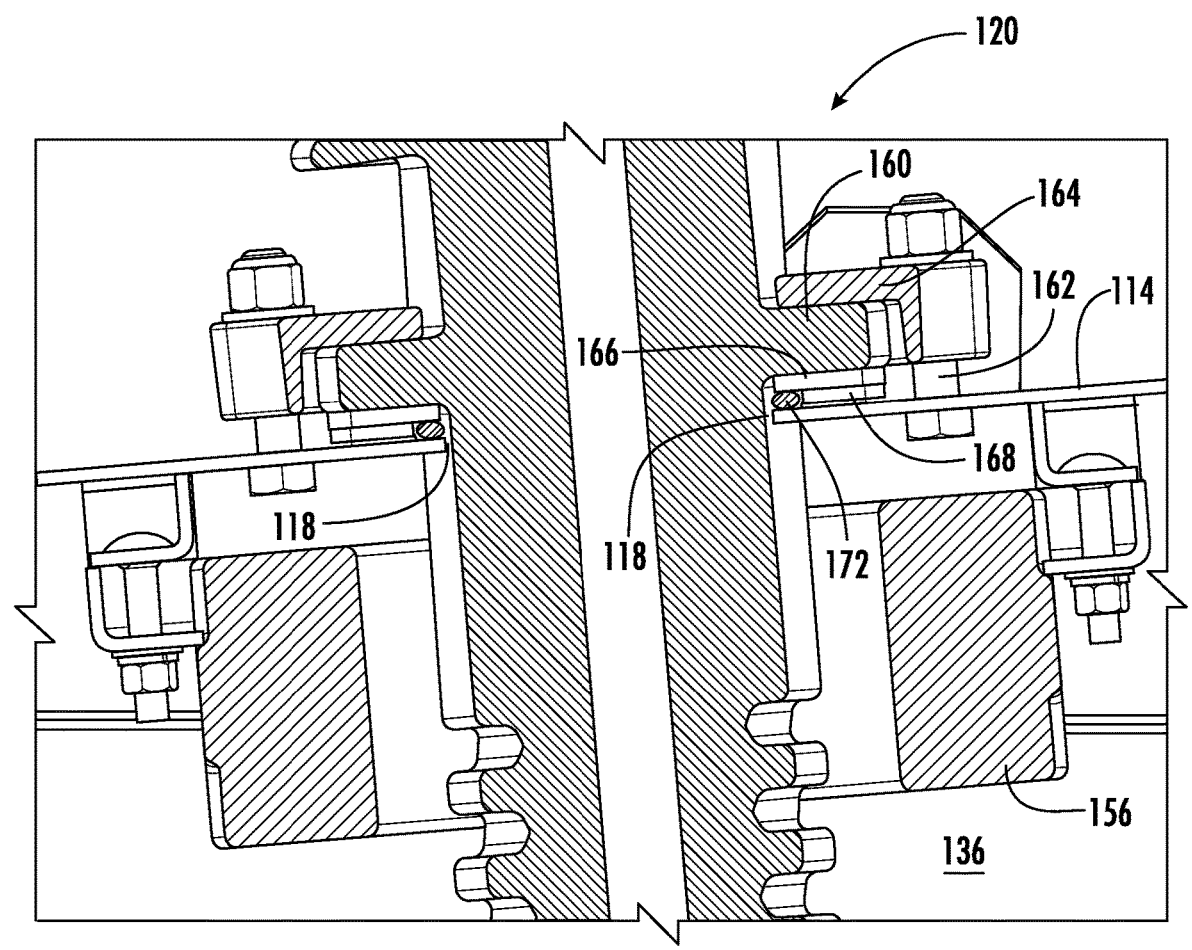
FIG. 7 is another enlarged sectional view of the terminal bushing shown in FIG. 6.
Figure 8:
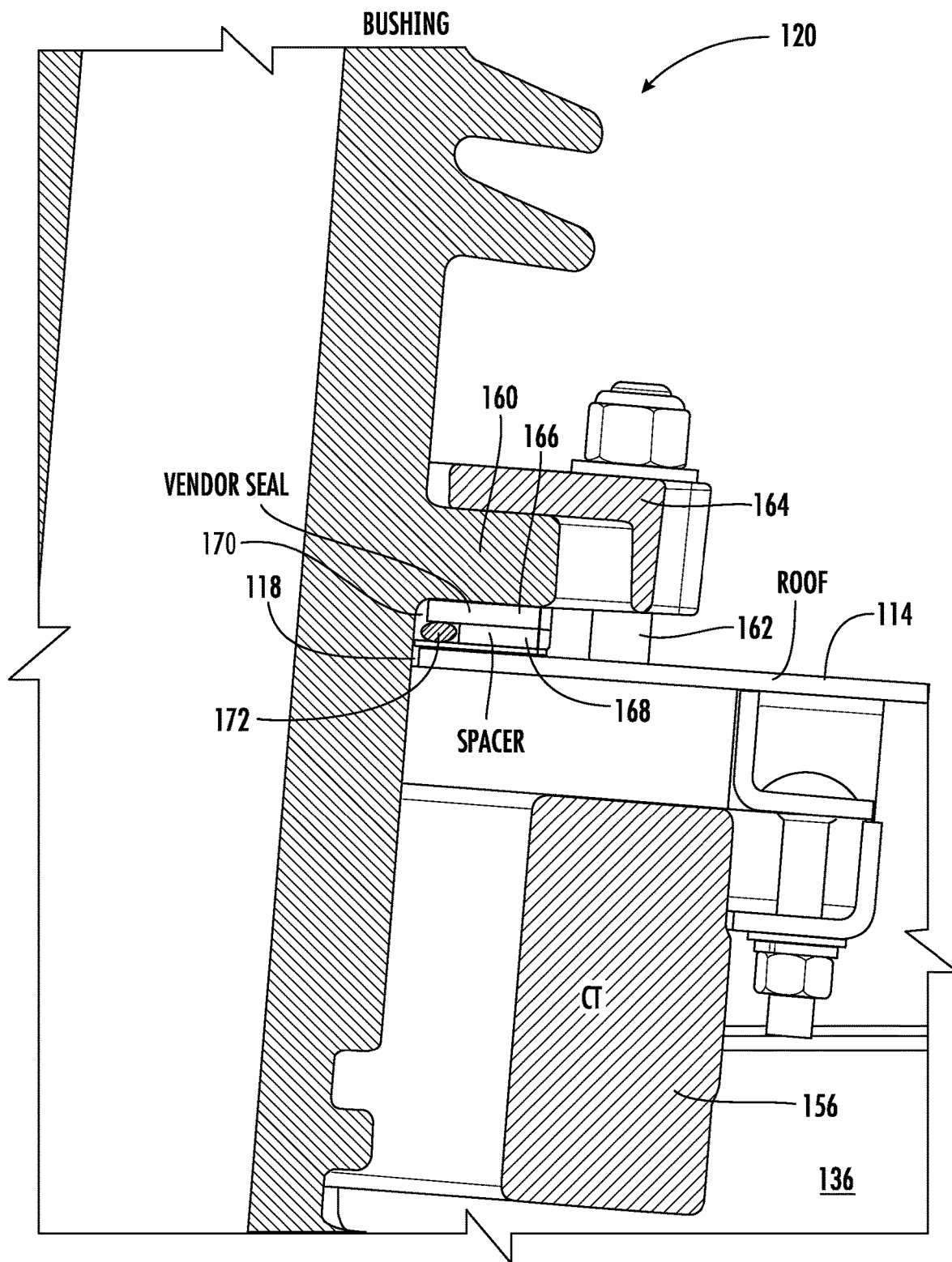
FIG. 8 is another enlarged sectional view of the terminal bushing shown in FIG. 6 and showing in detail the dynamic seal contained within the seal pocket.

Each terminal bushing 120 includes a gasket 166 operative as a seal, as best shown in the enlarged sectional views of FIGS. 7 and 8. This gasket 166 may be a vendor provided gasket, although it is not necessary to be vendor provided and may be custom designed. In many conventional terminal bushing sealing techniques for outdoor circuit breakers, caulking is applied onto any vendor provided gaskets, which is usually formed from an elastomeric polymeric material, and together with the caulking, is used in an attempt to seal a terminal bushing 120 to prevent leakage of water and other foreign matter into the outdoor housing 106. However, any conventional mounting clamp, any fasteners such as bolts and nuts, and the outer surface, such as the roof of the housing 106, are formed from a first material, such as aluminum, having a first coefficient of thermal expansion, while the terminal bushings 120 are each formed of a second material having a secondary coefficient of thermal expansion, such as ceramic. Of course, steel and other materials may be used.

Circuit breaker components formed from a material, such as ceramic, do not change in dimension due to temperature variations as readily as those components formed from a material, such as steel, aluminum, or similar material. Thus, the temperature differentiation that may exist in outdoor circuit breakers such as from a low of −40° Fahrenheit to a high of 140° Fahrenheit under normal operating conditions are often so great that leakages occur because the caulking in conventional outdoor breaker configurations does not hold. Thus, in conventional outdoor circuit breakers, a good seal is not provided.

Compression on one side of a terminal bushing 120, such as created by cantilever forces exerted by connected cables, may cause the other side of the terminal bushing to lift. As a result, moisture may enter the outdoor circuit breaker 100 via its outer surface 114, such as the roof of the housing 106, and via the bushing openings 118, and cause damage to components inside the housing and create hazardous operating conditions.

In accordance with a non-limiting example, a spacer 168 in this example is positioned between the upper gasket 166 and the top surface of the roof 114, and configured to form a seal pocket 170 bounded by the bushing opening 118, the upper gasket 166, the spacer 168 and an outer surface of the terminal bushing 120. The spacer 168 is optional, and instead of using the spacer, a forming tool may be employed to form the seal pocket 170 by crimping or deforming the outer surface, such as the roof.

As illustrated best in FIG. 8 showing in greater and enlarged detail the seal pocket 170, a dynamic seal 172 is contained in the seal pocket and compressed in an amount sufficient to provide elasticity and a compression height for dynamic loading of the upper gasket 166. In an example, it is possible to obtain at least about 0.05 inches (about 1/16 inch) dynamic movement before the dynamic seal 172 opens up the joint and allows water or other foreign material leakage through the bushing openings 118 into the interior compartment 110.

The dynamic seal 172 may be formed as an O-ring such as from an elastomeric material, and it may be compressed about 20% to 40% when received within the seal pocket 170, and in this example, about 30%, and thus, impart dynamic resilience. In another example, the dynamic seal 172 may be formed as a C-shaped seal having a spring therein. When the spacer 168 is employed, instead of using a crimp or other forming tool to help form the seal pocket 170, the spacer is usually formed of the first material having a first coefficient of thermal expansion, such as aluminum, so that it has the same expansion and contraction in size proportional to the mounting bolts 162 and their nuts, the outer surface 114 such as the roof, and the mounting clamp 164, which also in this example are also formed of aluminum. Thus, the configuration of the dynamic seal 172 in the sealing pocket 170 provides added protection against common leakage issues related to the terminal bushings 120 received in bushing openings 118, a problem that plagues most conventional outdoor circuit breakers.

Referring now to FIGS. 9-12, there is illustrated an example of an indicator 176 that is operable via an actuator 234, in this example, a magnetic actuator, and movable between first and second positions corresponding to respective closed and open breaker positions. The indicator 176 has a first indicator surface 176a with a first indicia such as a red color on its surface and a printed text word, such as "CLOSED" indicative that the at least one circuit interrupter as an example vacuum interrupter 124 is in a closed breaker position. A second indicator surface 176b has a second indicia indicative that the at least one vacuum interrupter 124 is in the open breaker position. The second indicator surface 176b could be a green color and the word "OPEN" displayed thereon indicative that the particular circuit interrupter tripped open, for example.

In this example, a pivot arm 178 (FIG. 9) has a first end 178a cooperating with the magnetic actuator 234 via an actuator plate 316 and a second end 178b connected to the indicator 176, which in this illustrated example is formed as a curved plate that has an upper section and a lower section corresponding to the respective first and second indicator surfaces 176a, 176b having the first and second indicia. The magnetic actuator 234 includes a movable output 314 formed as a cylindrical member that supports the actuator plate 316 as best shown in the enlarged isometric view of FIG. 9, which moves relative to the fixed section of the magnetic actuator and imparts the driving force to the first end 178a of the pivot arm 178, which is biased against the actuator plate 316.

Figure 9:
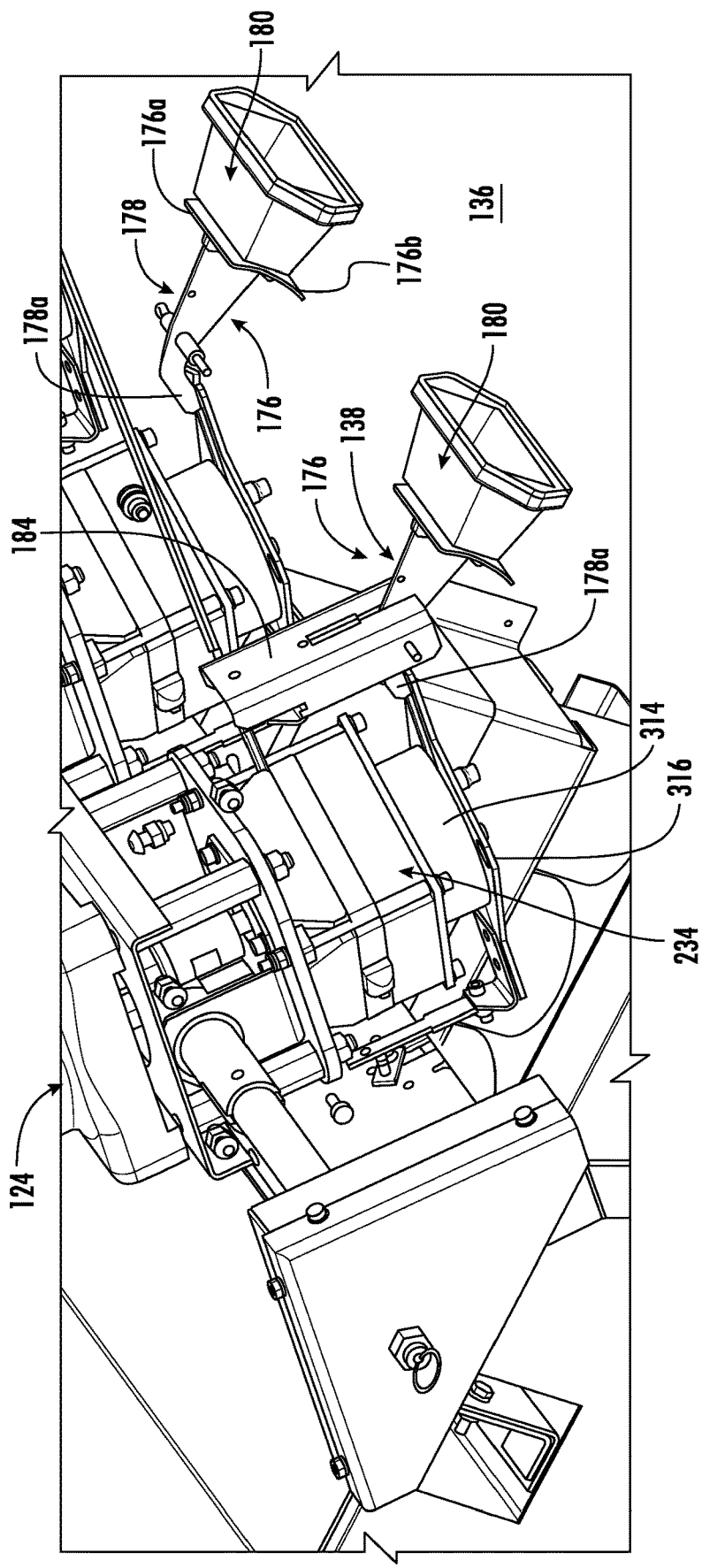
FIG. 9 is a fragmentary isometric view of a portion of the interior of the circuit breaker and the indicator operated by the actuator.
Figure 12:
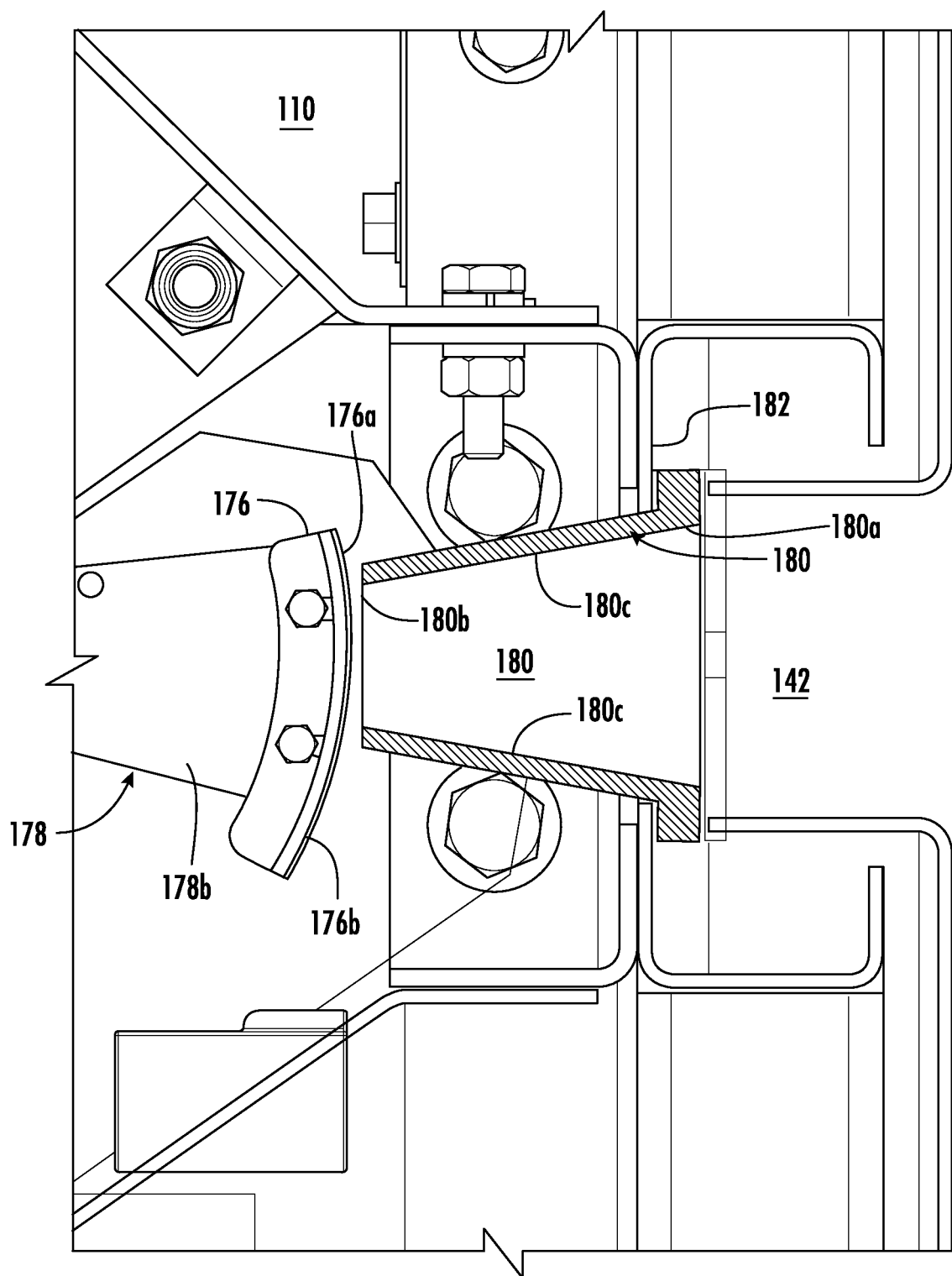
FIG. 12 is another enlarged sectional view of the indicator of FIG. 11 and showing in detail the light tunnel.
Figure 13:
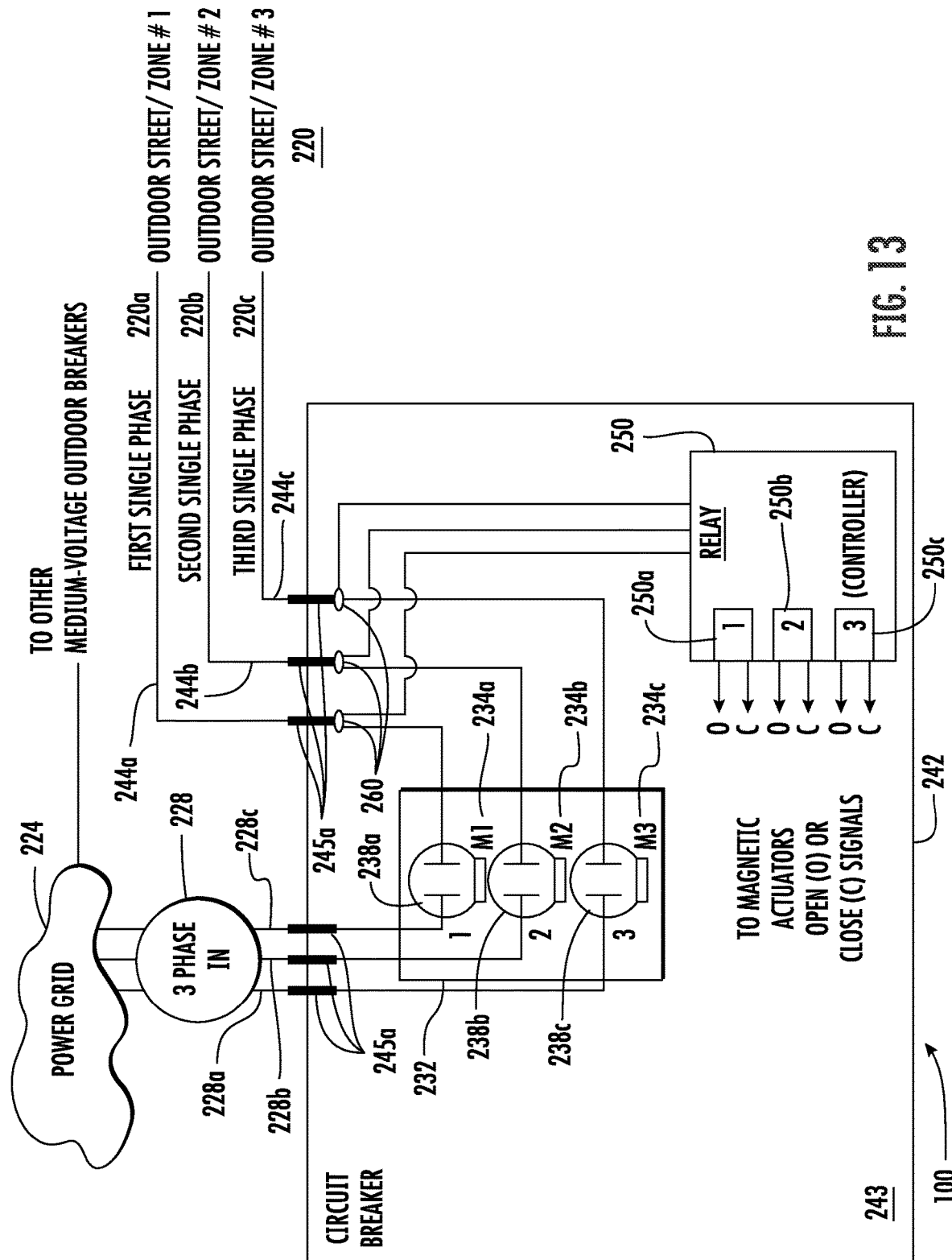
FIG. 13 is a block diagram of a three-phase power distribution grid and a medium-voltage circuit breaker having single-phase breaker control using magnetic actuators in accordance with a non-limiting example.

As shown in FIGS. 9 and 12, a light guide is formed in this example as a light tunnel 180 and is mounted adjacent to a respective opening forming a view window 142 within the outdoor housing 106 (FIGS. 1 and 12) and configured to guide light from outside the outdoor housing onto the particular first or second indicator surface 176a, 176b that is pivoted to be adjacent and in view to a user from the light tunnel 180. This light tunnel 180 has a light entrance 180a adjacent the opening as the view window 142, and in this example, set back a short distance, such as one to two inches (FIG. 12), and extends within the outdoor housing 106 to a light exit 180b that is adjacent the indicator 176 and dimensioned so that the opening defined by the light entrance 180a of the light tunnel is larger than the light exit 180b.

Light is guided from the light entrance 180a to the light exit 180b. The light tunnel 180 as a manufactured component may be formed from additive manufacturing techniques and may include an internal reflective surface coating 180c similar to a chrome mirror. The light tunnel 180 may be a 3D printed component. In this example, the light tunnel 180 is substantially rectangular configured as illustrated and tapers from the larger light entrance 180a to the smaller light exit 180b, such that in combination with the internal reflective surface 180c, light is guided onto the indicator 176. A mounting flange 182 formed at the light entrance 180a secures the light tunnel 180 at the opening (FIG. 12) as the view window 142 through which an individual may view the first or second indicia on the respective surface 176a, 176b of the indicator 176, depending on how the indicator is pivoted to determine visually whether the vacuum interrupter 124 is in the closed or open breaker position. In this example, three indicators 176 are mounted in side-by-side relation and cooperate with a respective magnetic actuator 234, one for each indicator, corresponding to the three phases.

As illustrated best in FIG. 9, the pivot arm 178 is formed as a lever and supported for pivotal movement by a support assembly 184 that includes a bracket or other support and may be secured to the magnetic actuator 234 and other frame 104 and support components. The pivot arm 178 may be supported for pivotal movement on the support assembly 184 via a pivot pin or other mechanism. The first end 178a of that pivot arm 178 is angled to be biased against the actuator plate 316. When the magnetic actuator 234 receives an open or close signal, in an example, the open signal in response, the magnetic actuator "breaks" the vacuum interrupter 124 connected thereto into an open circuit condition. The actuator plate 316 moves down via its movable output such as part of a drivable shaft of the magnetic actuator 234 to which it is connected.

Figure 10:
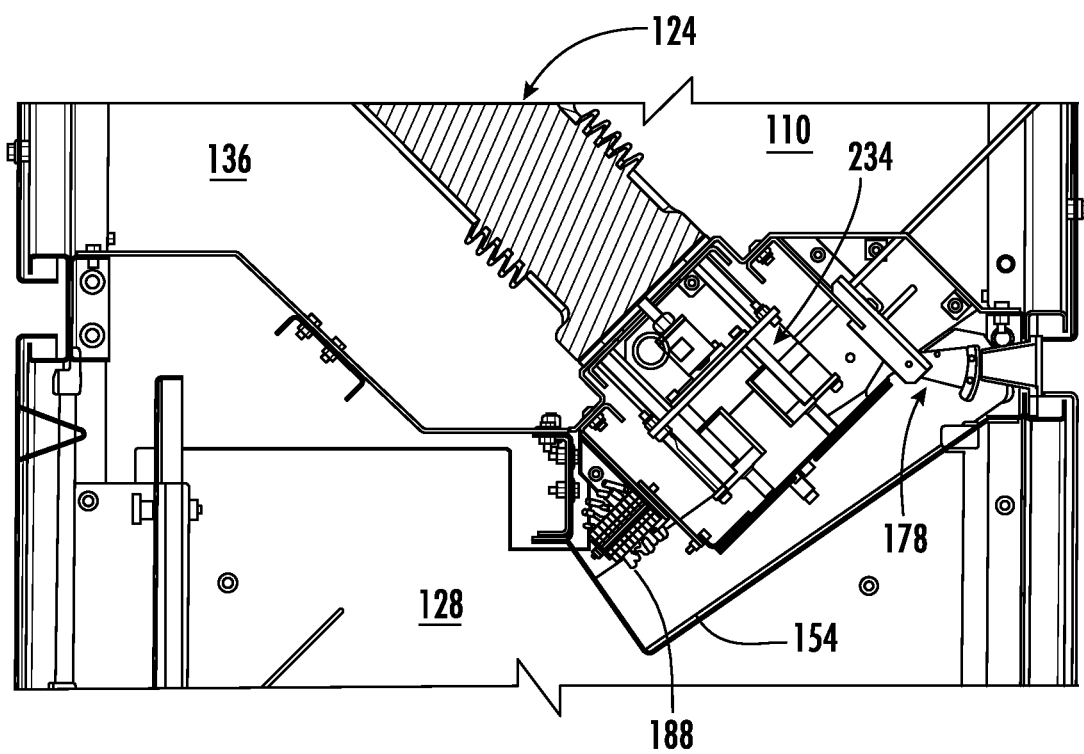
FIG. 10 is a sectional view of a portion of the circuit breaker showing the actuator and indicator.
Figure 11:
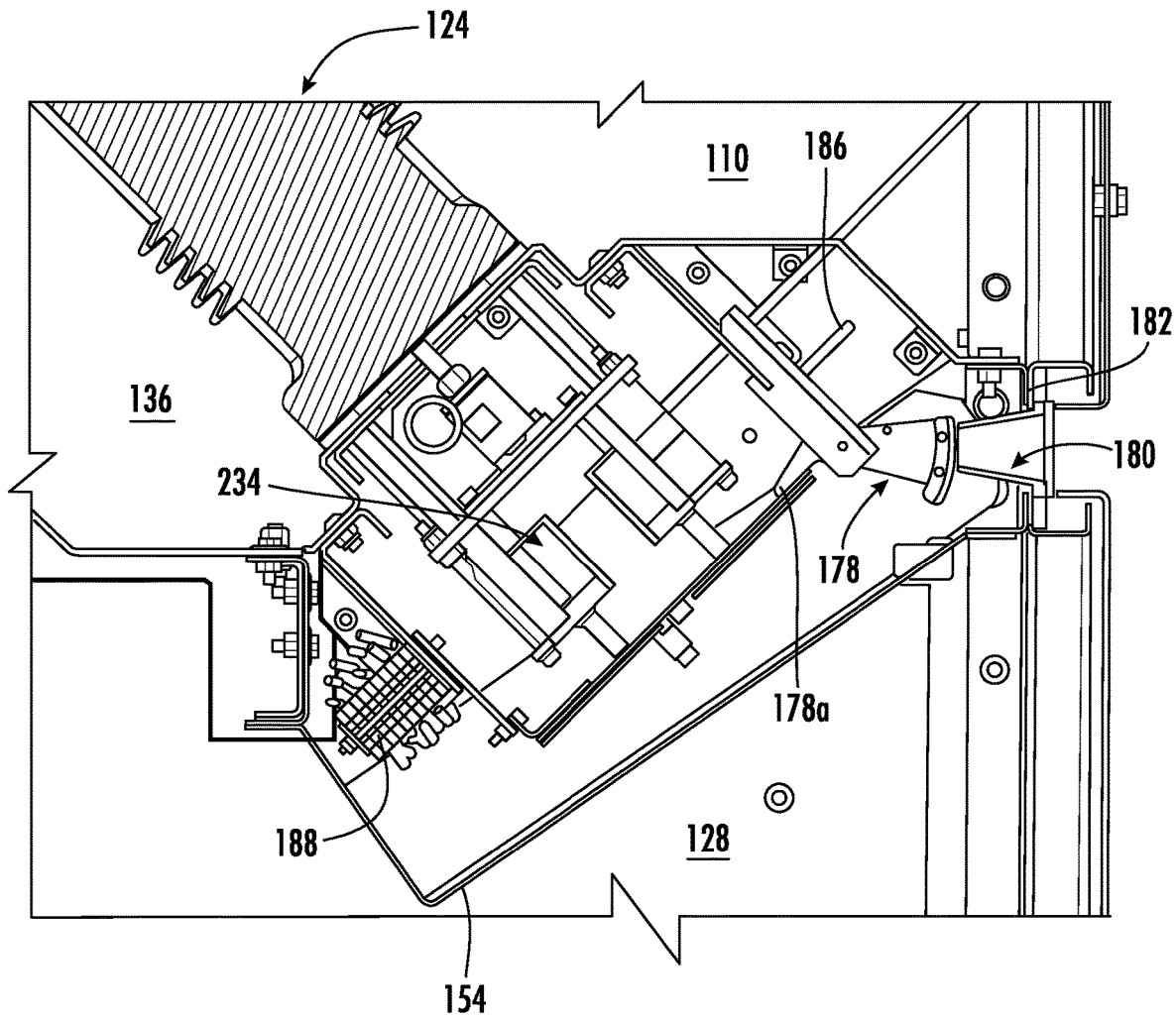
FIG. 11 is an enlarged sectional view of the actuator and indicator shown in FIG. 11.

The pivot arm 178 may be biased by a spring mechanism 186 (FIG. 11), which may force the second end 178b of the pivot arm 178 to move the second indicator surface 176b and the second color, e.g., green and the "OPEN" word adjacent the light entrance 180a of the light tunnel 180. As shown in FIGS. 10 and 11, various electronic components 188, such as control electronics, may be positioned within the high-voltage compartment 136 adjacent to each magnetic actuator 234. The indicator 176 thus provides a readily available indicia that a user may view with little difficulty and determine with a quick visual glance whether a particular vacuum interrupter 124 is in a closed or open position.

Referring now to FIG. 13, there is illustrated a schematic diagram of the medium-voltage circuit breaker 100, such as an outdoor circuit breaker, but could be an indoor circuit breaker. The circuit breaker 100 is incorporated within a three-phase power distribution grid 224 that includes a three-phase input 228 having first, second and third single-phase input circuits 228a, 228b, 228c into the medium-voltage circuit breaker. The circuit breaker 100 may be formed to be placed outdoors, although it is possible to use the equipment for indoor use with associated indoor switchgear systems. The circuit breaker 100 includes single phase breaker control that allows the circuit breaker to provide single-phase control over one or two or all three single-phase lines, and in an example of selectively opening and closing one, two and/or three lines. In an example, power may be maintained on a remaining single-phase line such as for powering an outdoor street zone as part of a neighborhood, or power part of a residential tower when the other one or two of the other single-phase lines may go down. In this example, the magnetic actuators 234 are shown schematically by M1, M2 and M3 and given the designation 234a, 234b, 234c, and actuate opening or closing of contacts within the first, second and third vacuum interrupters indicated at 238a, 238b, 238c.

Other neighborhoods or street sections may form the load 220 and are schematically illustrated by the outdoor street zones numbered one to three forming respective single phase loads 220a, 220b, 220c. For example, the first outdoor street zone 220a may have its power cut off when the first single-phase line 220a is dropped, such as through overcurrent or short circuit as a non-limiting example, but the other two outdoor street zones 220b, 220c may be supplied by the other two single-phases, i.e., the second and third single phases, and thus, power remains on those two street zones. For example, the first single phase outdoor street zone 220a may have a short circuit in that single-phase segment, such as when a power line may have been downed. That single-phase may be tripped at the single-phase pole, e.g., at the vacuum interrupter 238a for that phase, but the two other second and third single phase outdoor street zones 220b, 220c may have power provided from the other two single phase circuits because the controller 250, which may be a relay as explained below, ensured that those vacuum interrupters 238b, 238c remain in a closed operative state and maintain power to those street zones. It should be understood that one controller or relay 250 may be used or individual controllers or relays 250 for each of the three phases with various types of relay circuits employed. In FIG. 13, individual relays or controllers may be used as shown by the block designation 250a, 250b, 250c, having a respective open (o) or close (c) signal output to a respective magnetic actuator. A controller 250 having microprocessor functions may be configured to operate as a relay.

The circuit breaker 100 may include components common to many circuit breakers, such as the frame shown by the solid line at 242 forming the housing and having an interior compartment shown at 243 and an outer surface with terminal bushings 245a, and the three-phase inputs 228a-c connected to the respective first, second and third single-phase circuits of the three-phase power distribution grid 224. The circuit breaker 100 has first, second and third single-phase outputs 244a, 244b, 244c that output the three phases via terminal bushings 245a. In an outdoor circuit breaker 100, there is no truck, and instead, the vacuum interrupters 238 are fixed inside an outdoor housing (FIG. 1).

The three-phase circuit breaker 100 includes the first, second and third single-phase vacuum interrupters 238a, 238b, 238c, where two are shown in the isometric cut-away view of FIG. 4 (and given designation 124), and configured to be connected between the respective first, second and third single-phase inputs 228a, 228b, 228c and first, second and third single-phase outputs 244a, 244b, 244c as shown in FIG. 13. A first magnetic actuator M1 234a is connected to the first single-phase vacuum interrupter 238a. A second magnetic actuator M2 234b is connected to the second single-phase vacuum interrupter 238b. A third magnetic actuator M3 234c is connected to a third single-phase vacuum interrupter 238c. Each magnetic actuator M1 234a, M2 234b, M3 234c may be configured to receive an open or close signal from a respective relay or controller 250, and in response, actuate the respective vacuum interrupter 238a, 238b, 238c connected thereto into an open or closed circuit condition.

The relay or controller 250 as it may sometimes be employed is connected to each of the first, second and third magnetic actuators M1 234a, M2 234b, M3 234c, and configured to generate the open or close signal to a respective magnetic actuator in response to an undesirable circuit condition detected on a minimum of single-phase circuit as part of the load 220. For example, the relay or controller 250 may send an open signal to a magnetic actuator 234 and open that single-phase circuit on which the undesirable circuit condition was detected. A sensing circuit 260, such as initially described above or other sensing circuits, may be configured to detect the undesirable circuit condition. The sensing circuit 260 may include a current sensor, a potential or voltage sensor or both, and may be within the circuit breaker 100 as local to the device or remote from the device and positioned in the field, for example. One or more vacuum interrupters 238a, 238b, 238c may receive open or close commands from the controller 250. Power may be maintained on one or more of the remaining single-phase circuits over which a single-phase undesirable circuit condition was not detected.

One controller or relay 250 may be used and may be positioned inside the circuit breaker 100 or separate units 250a, 250b, 250c may be used to communicate and transmit open and close signals to the magnetic actuators 234a, 234b, 234c. When multiple controllers or relays 250 are used, a first controller or relay 250a may be connected to the first magnetic actuator M1 234a. A second controller or relay 250b may be connected to the second magnetic actuator M2 234b. A third controller or relay 250c may be connected to the third magnetic actuator M3 234c. In another example, the controller or relay 250 may be formed as a single module mounted local, i.e., within the interior compartment 243, or mounted remote such as outside the interior compartment and connected to each of the first, second and third magnetic actuators M1 234a, M2 234b, M3 234c.

The loads may include first, second and third single-phase loads 220a, 220b, 220c and are connected to respective first, second and third single-phase outputs 244a, 244b, 244c, such as the different outdoor street zones for different groups of residential houses. Each may have an electrical demand operating with single-phase. For example, the first street zone 220a may be powered by the first single-phase line, the second street zone 220b may be powered by the second single-phase line, and the third street zone 220c may be powered by the third single-phase line. In another example, it is possible to have first, second and third loads that may be a business that uses three-phase power and a group of homes that use a single-phase power.

As noted before, a sensing circuit 260 may be configured to detect the undesirable circuit condition on a minimum of a single-phase circuit. The sensing circuit 260 may be formed as three separate sensing circuits connected either local or remote to the circuit breaker. In an example, three sensing circuits 260 may connect to respective three terminal bushings, and could be a Rogowski coil, a current sensor, a potential sensor or both, or a capacitive or resistive voltage sensor. The sensing circuit 260 is connected to the controller/relay 250, which may generate an open or close signal on three sets of open or three sets of close signal lines and signals a respective magnetic actuator M1 234a, M2 234b, M3 234c to actuate and move the movable contact of the respective vacuum interrupter 238a, 238b, 238c into open or closed circuit positions in this example. The controller/relay 250 may include the three different individual controller or relay circuits 250a, 250b, 250c for each respective magnetic actuator 234a, 234b, 234c, and generate respective close and open signals. The sensing circuit 260 may send proportioned signals for the controller/relay 250.

Figure 5:
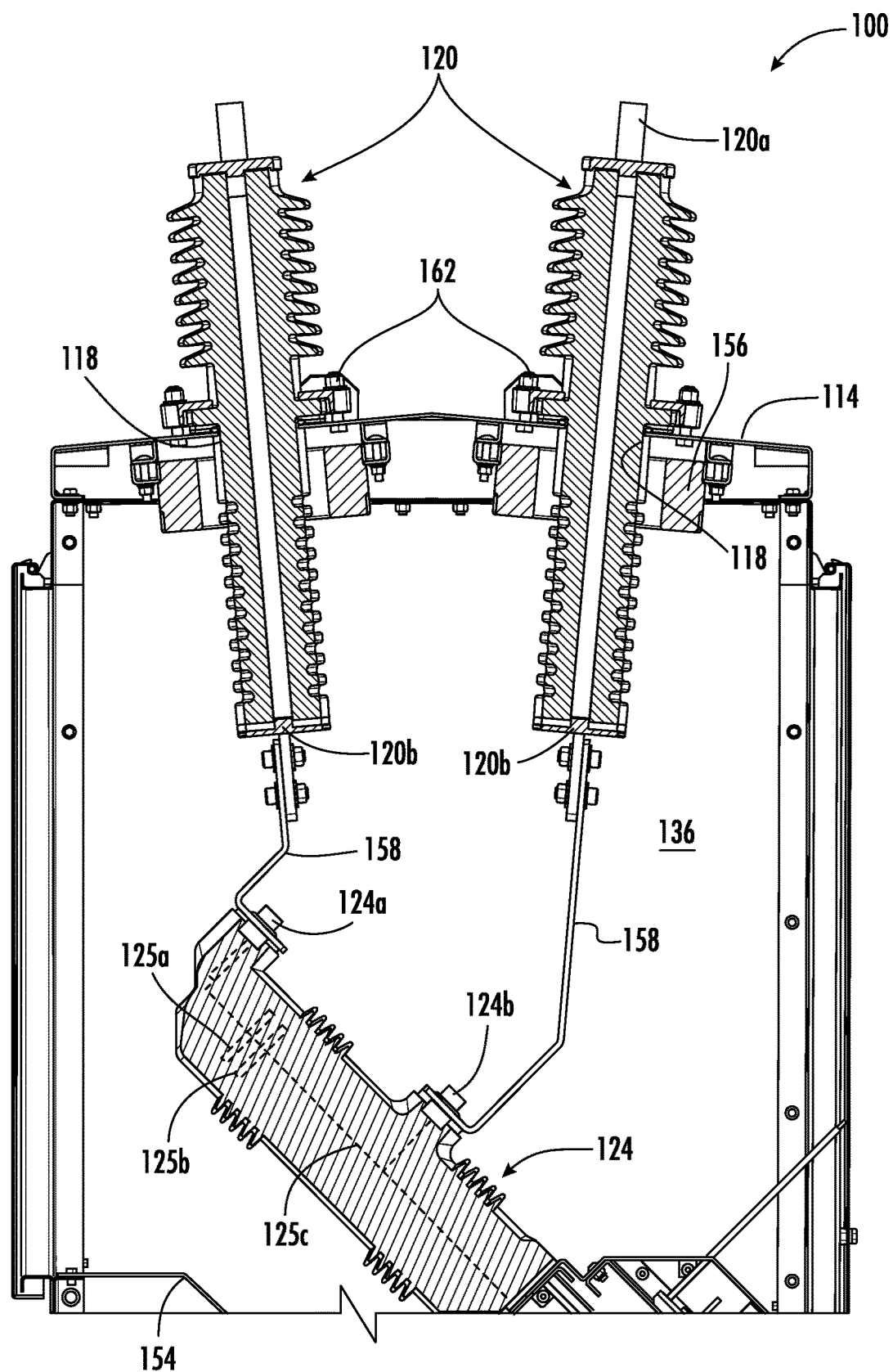
FIG. 5 is a sectional view of the upper high-voltage compartment of the circuit breaker of FIG. 1 showing a vacuum interrupter and terminal bushing connected thereto.
Figure 6:
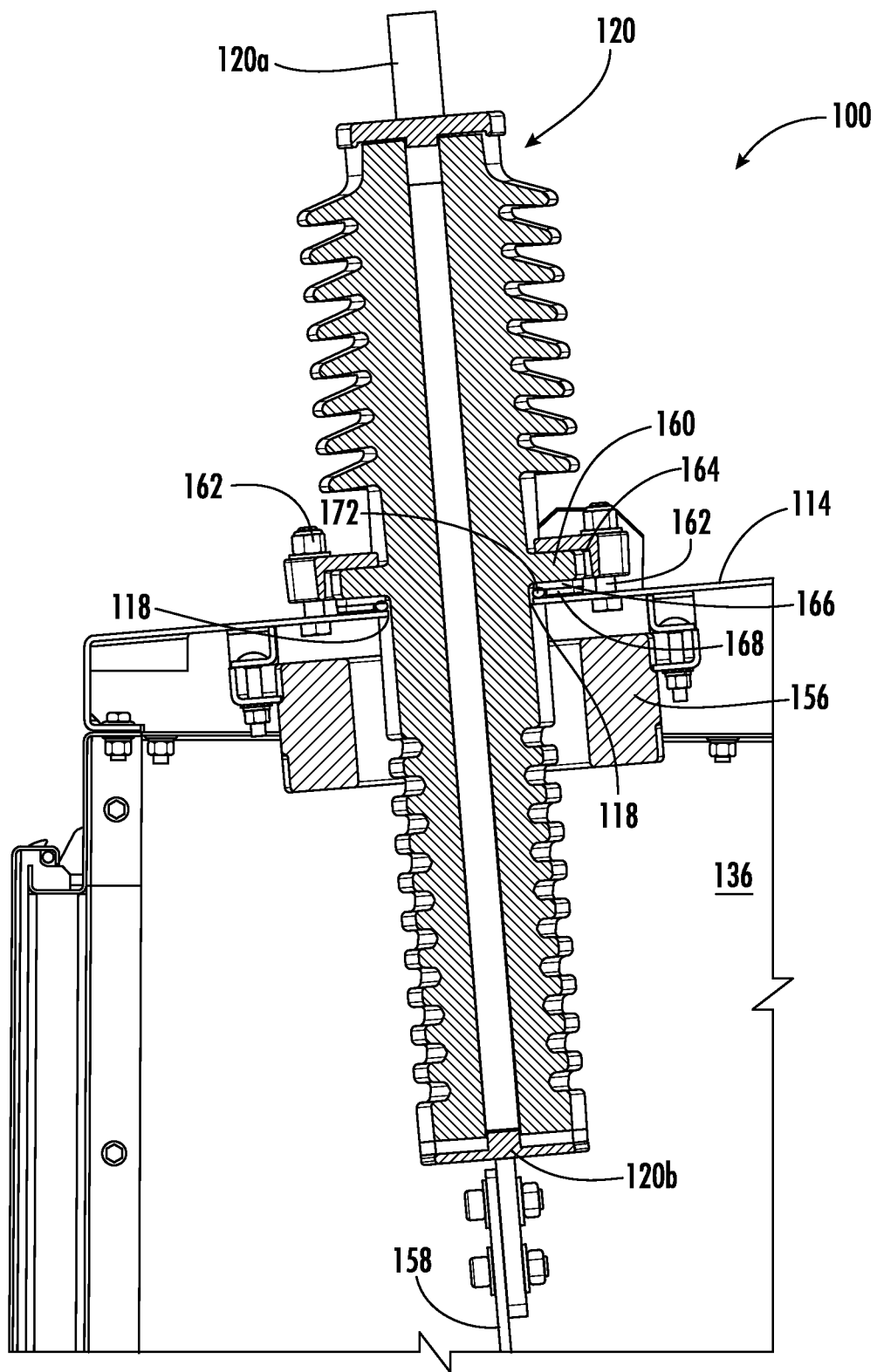
FIG. 6 is an enlarged sectional view of a terminal bushing shown in FIG. 5.
Figure 16:
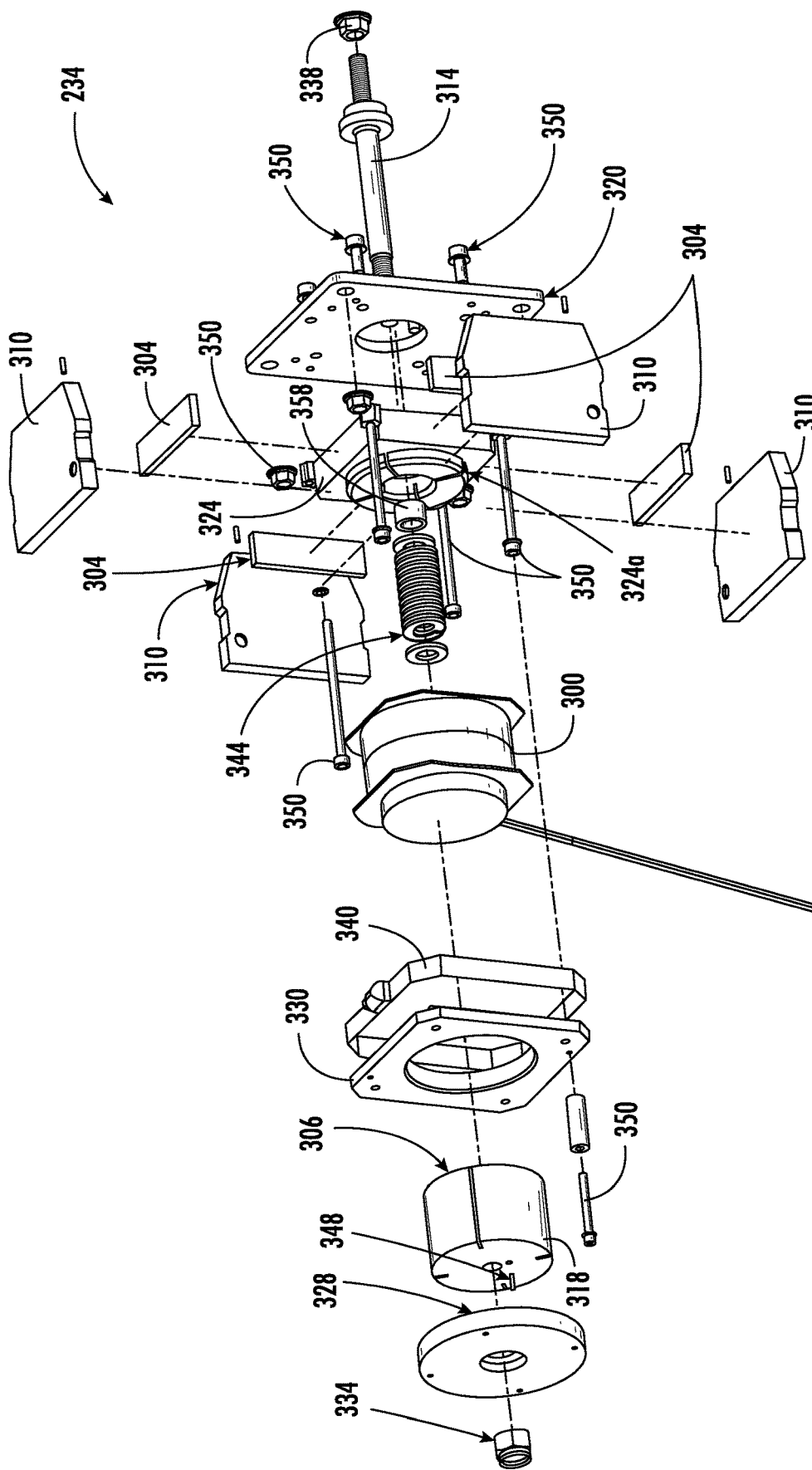
FIG. 16 is an exploded isometric view of the magnetic actuator of FIGS. 14 and 15.

Referring again to FIGS. 4 and 5, there are illustrated schematic sectional views of a vacuum interrupter 124 and operated by the example magnetic actuator 234, which may correspond to any one of the three magnetic actuators 234a, 234b, 234c shown in FIG. 13. The medium-voltage vacuum interrupter 124 shown schematically in FIG. 5 includes an inner fixed electrical contact 125a and a corresponding movable electrical contact 125b shown by dashed lines and form the switch or circuit breaker for electrical power interruption. The movable electrical contact 125b moves between a closed and open position via a connector, which in an example, may be termed an insulating contact shaft 125c that connects to an output shaft 314 as shown in FIG. 16. The vacuum interrupter 124 (FIG. 5) and magnetic actuator 234 are mounted in the circuit breaker 100 as an example outdoor circuit breaker as noted before, and angled relative to the vertical as shown in FIG. 5. The vacuum interrupter's fixed contact 125a forms a fixed terminal at the top that connects to a lower terminal end 120b of a terminal bushing 120 (FIG. 5).

The movable contact 125b may connect to a lower terminal end 120b of the vacuum interrupter 125, which in turn, connects to a lower terminal end 120b of another terminal bushing 120 that is associated with the terminal bushing 120 to which the fixed contact is connected. It is possible that the movable contact 125b may connect to a flexible terminal or a sliding contact terminal and lower contact arm. Upper and lower flanges may be included to hold an arc shield as part of an insulator. The vacuum interrupter 125 may include a bellows shield and bellows. In FIG. 5, for example, the terminal bushing 120 on the left may connect from the power grid 224, and the second terminal bushing on the right may connect to the load 220.

Figure 14:
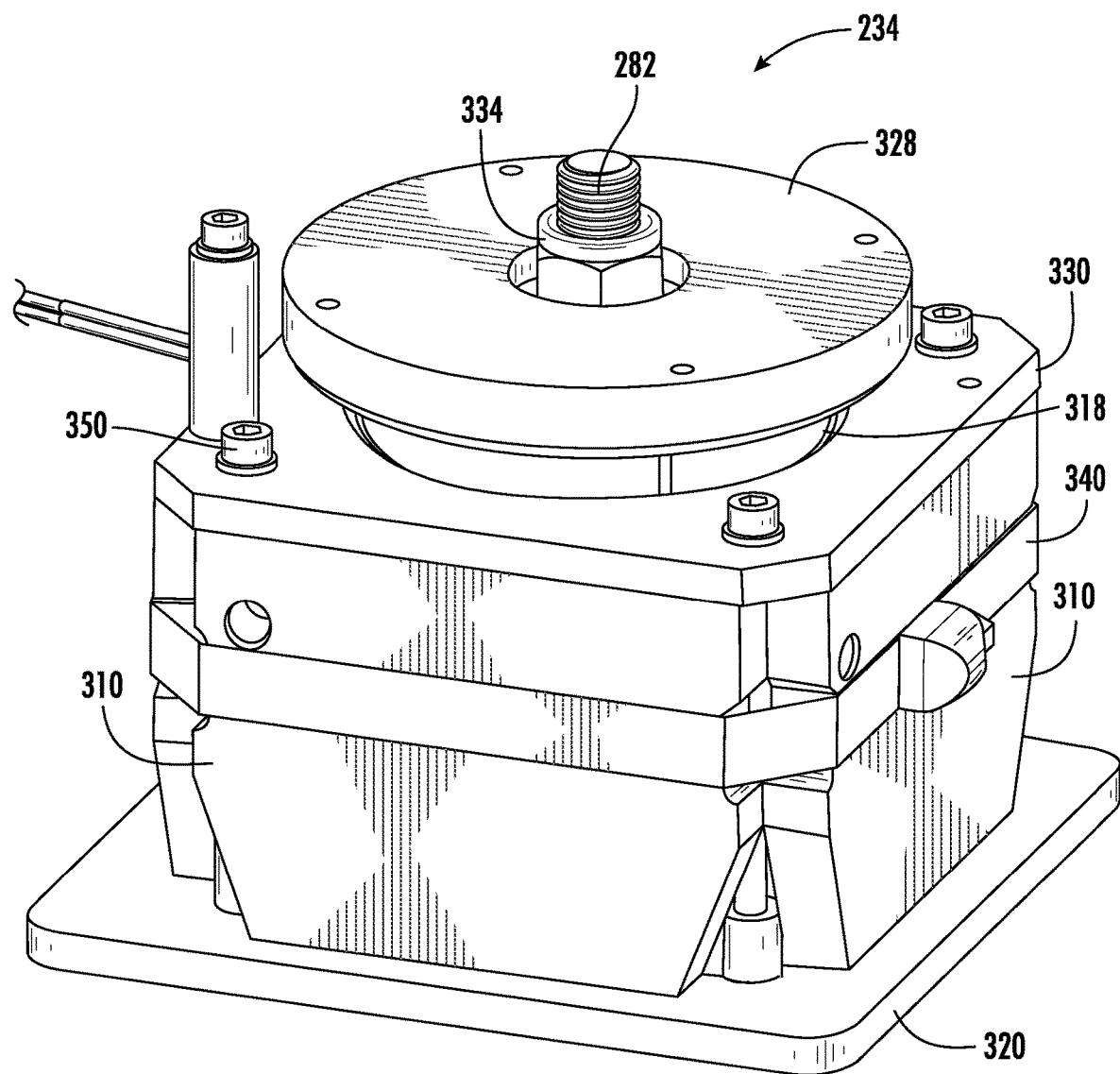
FIG. 14 is an isometric view of an example magnetic actuator that may be used in the circuit breaker shown in FIGS. 3, 4, 9, and 13.
Figure 15:
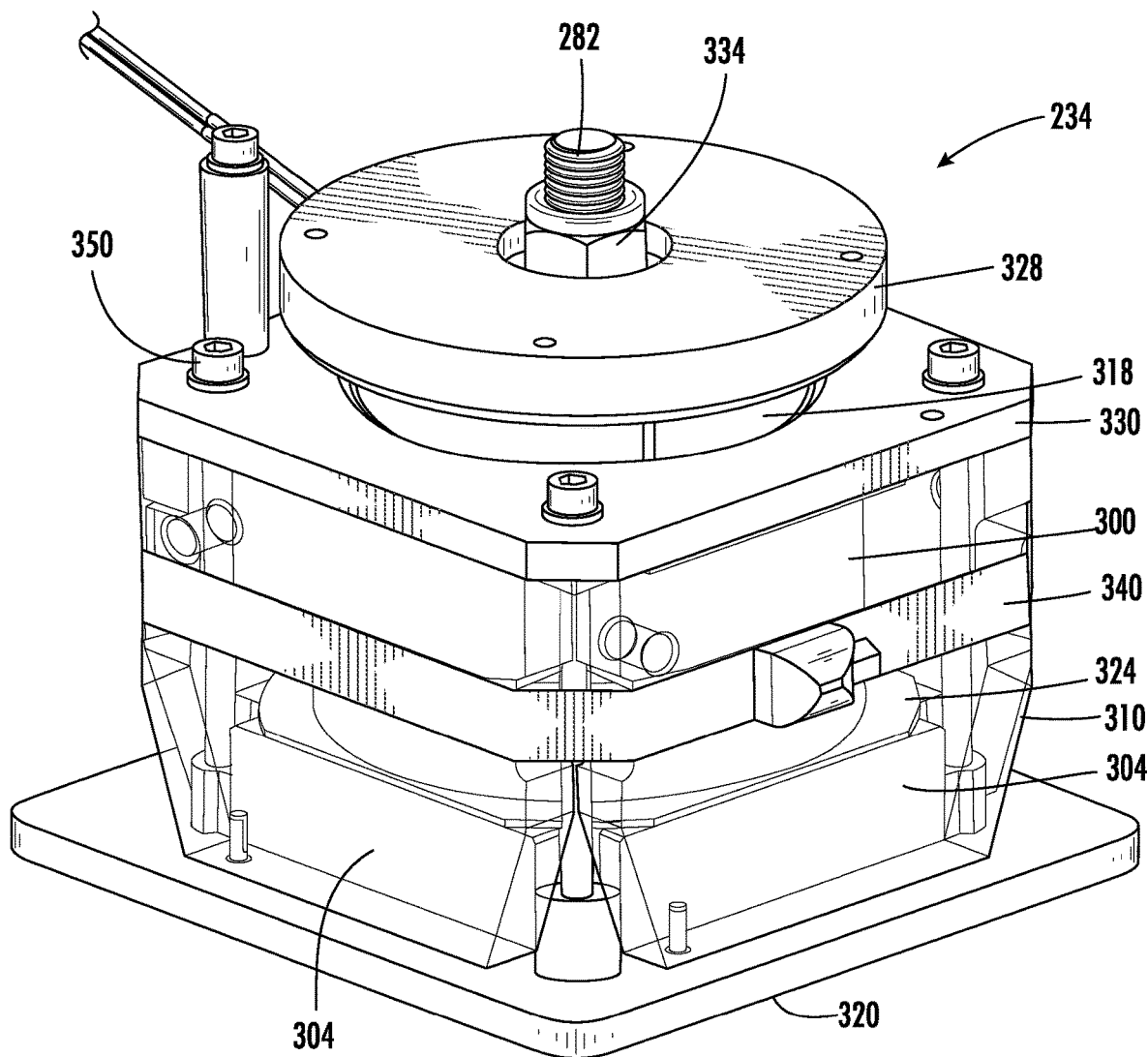
FIG. 15 is another isometric view of the magnetic actuator of FIG. 14, but showing permanent magnets located behind the side plates that are pictured in a transparency view.

Referring now to FIGS. 14-16, further details of the magnetic actuator 234 are illustrated, which includes a fixed core 324 and a plurality of permanent magnets 304 surrounding the fixed core 324. A movable core 306 (FIG. 16) is received within the fixed core 324 and includes an output shaft 314 coupled to a piston 318 and piston plate 328. The plurality of permanent magnets 304 are arranged in a rectangular, and in this example, a square configuration around the fixed core 324. Each permanent magnet may be formed as a bar magnet that extends the length of a side forming the rectangular, and in this example, square configuration (FIG. 15). In a non-limiting example, each bar magnet as a permanent magnet 304 may be rectangular configured. A side plate 310 covers each permanent magnet 304 forming a box configuration. The movable core 306 includes its output shaft 314 and a piston 318 and movable within the fixed core 324.

The holding force for the magnetic actuator 234 is developed by the permanent magnets 304 while an electrical coil 300 that may be formed as a single or multiple winding coil and provides the closing speed and force that is generated by the coil and amperage flowing in the windings of the coil. The permanent magnets 304 surrounding the fixed core 324 form a toroid of a magnetic field surrounding the fixed core. The output shaft 314 has an end configured to connect to a connector 280, e.g., the insulating contact shaft 125c, as part of the vacuum interrupter 124 connected thereto and shown in FIG. 5.

The exploded isometric view of FIG. 16 shows further details where each permanent magnet 304 may be formed as a bar magnet, and in a non-limiting example, may be rectangular configured, and in an example, have dimensions of about 1.0 inch by 4.0 inches and a one-quarter inch thick and formed in this non-limiting example from a machined or cast Neodymium Iron Boron magnet (NdFeB or NIB magnet). One or more magnets 304 may be used per side depending on design. The permanent magnets 304 may be made from this alloy of Neodymium, Iron and Boron in this example and created as a 42H magnet grade as a rare-earth sintered neodymium magnet.

In this example, the magnetic actuator 234 includes an application plate 320 that engages a center block as the fixed core 324. Both the application plate 320 and center block as the fixed core 324 have a central, circular opening into which the output shaft 314 is received. The piston 318 engages the piston plate 328 that engages a bottom plate 330 when the piston plate moves with the piston toward the bottom plate. The movable core 306 includes the output shaft 314 and is similar to a push rod. The output shaft 314 is secured with a lock nut 334 at the piston plate 328 and with a flange nut 338 at the other end that operates as a connection to the insulating contact shaft 280 also referred to by some as a push rod. The permanent magnets 304 engage against the side of the center block as the fixed core 324, which has a cylindrical fitting 324a on which the lower edge of the electrical coil 300 may engage. The side plates 310 help form the square configuration as illustrated and are secured in position at the magnetic actuator 234 and against the application plate 320 and bottom plate 330 via a vibration resistant clamp 340.

A die spring 344 is contained within the piston 318 and is secured and aligned to the piston plate 328 via alignment pin 348. Various fasteners 350 are illustrated to hold components together. It is possible to include stand-offs (not shown) that allow the magnetic actuator 234 to be positioned so that it may be connected to a frame or other component. The output shaft 314 may be secured to the insulating contact shaft 280.

In an example, the electrical coil 300 resistance may be about 3.8+/−0.2 ohms and the permanent magnets 304 may include a minimum average holding force among five readings that is equal to about 9,000 N (Newtons) with a minimum single hold force reading of a four position rotation of the piston 318 of about 8,900 N. As noted before, the holding force is developed by the permanent magnets 304 and closing speed and force is generated by the coil 300 and amperage flowing in the windings. In an example, the magnetic actuator 234 may be formed as an 8.5 kN box actuator having a 14 millimeter travel. The output shaft 314 may pass through a low coefficient of friction, Teflon (PTFE) sleeve bearing 358 (FIG. 16) and the die spring 344 has sufficient force for biasing against movement of the applied magnetic force. The die spring 344 biases in the open position.

A controller used for the devices may be connected to a secondary voltage that may be present in the outdoor circuit breaker 100 such as 100 volts, 200 volts, or 250 volts, which in one example operates off 250 volts. A charge capacitor (not shown) in an example may always be charged to 250 volts and a controller may facilitate the connection between the charge capacitor and magnetic actuator 238 to generate the magnetic flux in the coil and move it in the opened and closed condition. The current is short and creates a very strong magnetic field and moves the insulating contact shaft 125c and moves the movable contact or terminal 125b relative to the fixed contact 125a. The medium voltage circuit breaker 100 may control 15 kV power in an example, but may operate from a control voltage of 48, 125, 250 volts DC or 120, 220 volts AC.

The magnetic actuator 234 is compact and because of its configuration of the four permanent magnets 304 in a square configuration in this example as illustrated, it is efficient and creates a high permanent magnetic force. The use of flat plates for the permanent magnets 304 generate a more uniform toroid for the magnetic field around the fixed core 324. It is possible that the permanent magnets 304 may be arranged in different configurations besides a square configuration, such as a triangular or a pentagon, i.e., five-sided or other configuration. The side plates 310 may be formed from a ferromagnetic material to carry the magnetic field. The magnetic actuator 234 as described is an improvement over other magnetic actuator designs that may include lower and upper plungers or permanent magnets that may be in a C-shaped armature configuration, or use stacked sheets or energized coils.

This application is related to copending patent applications entitled, "CIRCUIT BREAKER WITH INDICATOR OF BREAKER POSITION," and "CIRCUIT BREAKER WITH SINGLE PHASE CONTROL," which are filed on the same date and by the same assignee and inventors, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A circuit breaker, comprising:
a frame defining a housing having an interior compartment and an outer surface and a bushing opening;
a circuit interrupter mounted within the interior compartment;
a terminal bushing received within the bushing opening and having a terminal end extending into the housing and electrically connected to the circuit interrupter, and an outer flange that forms a bushing seat positioned adjacent the outer surface of the housing;
an upper gasket received against the outer flange;
a seal pocket formed by the bushing opening, the upper gasket, and an outer surface of the terminal bushing; and
a dynamic seal comprising a C-shaped seal having a spring therein and contained within the seal pocket and being compressed an amount sufficient to provide elasticity and a compression height for dynamic loading of the upper gasket.

2. The circuit breaker of claim 1 wherein said dynamic seal comprises an O-ring formed of an elastomeric material.

3. The circuit breaker of claim 2 wherein said O-ring is compressed about 20 to 40 percent when received within the seal pocket.

4. The circuit breaker of claim 1 comprising at least one clamp engaging an upper surface of the outer flange, and a fastener securing said at least one clamp.

5. The circuit breaker of claim 1 wherein said at least one clamp, fastener, and outer surface are formed of a first material having a first coefficient of thermal expansion, and the terminal bushing is formed of a second material having a second coefficient of thermal expansion.

6. The circuit breaker of claim 1 wherein said circuit interrupter includes closed and open breaker positions and an actuator mounted within the interior compartment and connected to said circuit interrupter and configured to actuate the circuit interrupter into the closed and open positions.

7. The circuit breaker of claim 6 wherein said actuator comprises a magnetic actuator configured to receive an open or close signal and in response, actuate the at circuit interrupter connected thereto into an open or closed circuit condition.

8. The circuit breaker of claim 1 wherein said frame is configured as an outdoor circuit breaker or an indoor circuit breaker.

9. The circuit breaker of claim 1 further comprising first, second and third single-phase circuit interrupters mounted within the interior compartment, each having closed and open breaker positions, and a respective first, second and third actuator connected to respective first, second and third single-phase circuit interrupters.

10. The circuit breaker of claim 9 wherein said first, second and third single-phase circuit interrupters each comprises a single-phase vacuum interrupter.

11. A circuit breaker, comprising:
a frame defining a housing having an interior compartment and an outer surface and first, second and third sets of first and second bushing openings;
first, second and third single-phase circuit interrupters mounted within the interior compartment and each having closed and open breaker positions and first and second terminals;
first, second and third sets of first and second terminal bushings received within the first, second and third sets of first and second bushing openings, each of the first, second and third sets of terminal bushings having a lower terminal end extending into the housing and electrically connected to first and second terminals of the respective first, second and third circuit interrupters, and an outer flange that forms a bushing seat positioned adjacent the outer surface, an upper gasket received against the outer flange, a seal pocket formed by the bushing opening, the upper gasket, and an outer surface of the terminal bushing, and an O-ring formed of an elastomeric material and contained within the seal pocket and being compressed about 20 to 40 percent when received within the seal pocket to provide elasticity and a compression height for dynamic loading of the upper gasket.

12. The circuit breaker of claim 11 comprising at least one clamp engaging an upper surface of the outer flange, and a fastener securing said clamp.

13. The circuit breaker of claim 11 wherein said at least one clamp, fastener, and outer surface are each formed of a first material having a first coefficient of thermal expansion, and the first, second and third sets of first and second terminal bushings are each formed of a second material having a second coefficient of thermal expansion.

14. The circuit breaker of claim 11 wherein said first, second and third single-phase circuit interrupters include closed and open breaker positions and first, second and third actuators mounted within the interior compartment and connected to respective first, second and third single-phase circuit interrupters and configured to actuate a selected single-phase circuit interrupter into the closed and open breaker positions.

15. The circuit breaker of claim 14 wherein each actuator comprises a magnetic actuator configured to receive an open or close signal and in response, actuate the respective single-phase circuit interrupter connected thereto into an open or closed circuit condition.

16. The circuit breaker of claim 11 wherein said frame is configured as an outdoor circuit breaker or an indoor circuit breaker.

17. The circuit breaker of claim 11 wherein said first, second and third single-phase circuit interrupters each comprises a single-phase vacuum interrupter.

18. An outdoor circuit breaker, comprising:
a frame defining a housing having an interior compartment and an outer surface and a bushing opening;
a circuit interrupter mounted within the interior compartment;
a terminal bushing received within the bushing opening and having a terminal end extending into the housing and electrically connected to the circuit interrupter, and an outer flange that forms a bushing seat positioned adjacent the outer surface of the housing;
an upper gasket received against the outer flange;
a seal pocket formed by the bushing opening, the upper gasket, and an outer surface of the terminal bushing;
a dynamic seal contained within the seal pocket and being compressed about 20 to 40 percent to provide elasticity and a compression height for dynamic loading of the upper gasket; and at least one clamp engaging an upper surface of the outer flange, and a fastener securing said at least one clamp.

19. The circuit breaker of claim 18 wherein said dynamic seal comprises an O-ring formed of an elastomeric material.

20. The circuit breaker of claim 18 wherein said dynamic seal comprises a C-shaped seal having a spring therein.

21. The circuit breaker of claim 18 wherein said at least one clamp, fastener and outer surface of the housing are formed of a first material having a first coefficient of thermal expansion, and the terminal bushing is formed of a second material having a second coefficient of thermal expansion.

22. The circuit breaker of claim 18 wherein said circuit interrupter includes closed and open breaker positions and an actuator mounted within the interior compartment and connected to said circuit interrupter and configured to actuate the circuit interrupter into the closed and open breaker positions.

23. The circuit breaker of claim 22 wherein said actuator comprises a magnetic actuator configured to receive an open or close signal and in response, actuate the circuit interrupter into an open or closed circuit condition.

24. The circuit breaker of claim 22 further comprising first, second and third single-phase circuit interrupters mounted within the interior compartment, each having closed and open breaker positions, and a respective first, second and third actuator connected to respective first, second and third single-phase circuit interrupters.

25. The circuit breaker of claim 24 wherein said first, second and third single-phase circuit interrupters each comprises a single-phase vacuum interrupter.

* * * * *